(12) United States Patent
Coleman et al.

(10) Patent No.: US 10,740,120 B2
(45) Date of Patent: Aug. 11, 2020

(54) DYNAMIC USER INTERFACE UPDATE GENERATION

(71) Applicant: Dell Products L.P., Round Rock, TX (US)

(72) Inventors: Andy Coleman, Allen, TX (US); Mark Anderson, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/958,950

(22) Filed: Apr. 20, 2018

(65) Prior Publication Data

US 2019/0324774 A1   Oct. 24, 2019

(51) Int. Cl.
| | |
|---|---|
| G06F 9/451 | (2018.01) |
| H04L 29/06 | (2006.01) |
| G06F 8/38 | (2018.01) |
| G06F 16/958 | (2019.01) |

(52) U.S. Cl.
CPC .............. *G06F 9/451* (2018.02); *G06F 8/38* (2013.01); *G06F 16/958* (2019.01); *H04L 63/20* (2013.01)

(58) Field of Classification Search
CPC .......... G06F 9/451; G06F 16/958; G06F 8/38; H04L 63/20
See application file for complete search history.

(56) References Cited

U.S. PATENT DOCUMENTS

| | | | |
|---|---|---|---|
| 2006/0149777 A1* | 7/2006 | Marchev | G06F 9/451 |
| 2008/0263179 A1* | 10/2008 | Buttner | G06F 16/957 709/218 |
| 2012/0304247 A1* | 11/2012 | Badger | G06F 21/6218 726/1 |
| 2017/0075663 A1* | 3/2017 | Jordan | G06F 8/38 |
| 2017/0126740 A1* | 5/2017 | Bejarano Ardila | H04L 63/20 |
| 2018/0041544 A1* | 2/2018 | Brookins | H04L 63/20 |

* cited by examiner

Primary Examiner — Ajay M Bhatia
Assistant Examiner — Mong-Shune Chung
(74) Attorney, Agent, or Firm — Norton Rose Fulbright US LLP

(57) ABSTRACT

A managing information handling system may dynamically update a user interface and transmit the updated user interface to a client information handling system. The user interface may be dynamically updated when an update to a user interface configuration is detected by the managing information handling system. The dynamically updated user interface may include dependency functionality so that when a master policy indicator is adjusted multiple policies that depend from the master policy are updated.

18 Claims, 8 Drawing Sheets

DYNAMIC USER INTERFACE UPDATE GENERATION

FIELD OF THE DISCLOSURE

The instant disclosure relates to user interface generation. More specifically, portions of this disclosure relate to dynamic user interface update generation for information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly interconnected. Interconnected information handling systems can be arranged in hierarchies where a single managing information handling system may manage multiple characteristics of a plurality of managed systems for security and convenience. For example, a single managing information handling system at a remote location may manage operating characteristics of multiple client information handling systems. The managing information handling system may allow an administrative user to connect remotely to manage the operating characteristics of the client information handling systems. A graphical user interface (GUI) may be displayed on an information handling system operated by the administrative user, providing the administrative user with information about client information handling systems managed by the managing information handling system and options for configuring the operating characteristics of the client information handling systems.

Shortcomings mentioned here are only representative and are included simply to highlight that a need exists for improved information handling systems, particularly for improved dynamic user interface update generation. Embodiments described herein address certain shortcomings but not necessarily each and every one described here or known in the art. Furthermore, embodiments described herein may present other benefits than, and be used in other applications than, those of the shortcomings described above.

SUMMARY

A user interface may be dynamically generated by a managing information handling system and transmitted to a client information handling system, and the user interface may also be dynamically updated. For example, a remote web server may manage the configuration of a plurality of information handling systems, such as smart phones, laptops, tablets, smart watches, and other connected devices. The managing information handling system may host multiple of policies, such as privacy or security policies, governing operation of the managed information handling systems. To allow configuration of the managed information handling systems, the managing information handling system may dynamically generate and transmit a user interface displaying options for configuration of the policies governing the managed information handling systems to a client information handling system. The managing information handling system may dynamically update the user interface and transmit the updated user interface to a client information handling system, allowing the user interface to reflect changes or additions to the options for configuration of the policies governing the managed information handling systems without restarting the client information handling system or closing and updating an application of the client information handling system. Furthermore, the dynamically generated user interface may include dependency mechanisms for allowing automatic adjustment of multiple dependent policies when a single master policy is adjusted.

A user interface may be dynamically updated based on changes to a user interface configuration, and the updated user interface may be transmitted to a client information handling system. A managing information handling system may detect an update to a dynamic user interface configuration while the user interface is being displayed by a client information handling system. The user interface may be a security policy management user interface for configuring security policies governing multiple managed information handling systems. For example, a security policy management user interface may be dynamically generated using one or more security policy files and one or more user interface configuration files. A managing information handling system may, upon startup or at other times when user interface generation is required, dynamically generate a user interface and transmit the user interface to a client information handling system. The user interface may then be displayed by the client information handling system. For example, the user interface may be displayed by an application executed by the client information handling system such as a web browser or a privacy or security configuration application.

While the user interface is being displayed, the managing information handling system may detect an update to a configuration of the user interface and may dynamically update the user interface. Examples of updates may include addition of new features, new products, new policy configuration options, and new types of devices that are configurable via the user interface. For example, the update may include the addition of a master policy indicator and a plurality of indicators for dependent policies to the user interface. When a user adjusts the master policy via the user interface, the plurality of dependent policies may be automatically adjusted. Updates to the configuration of the user interface may be included in a replacement or an additional XML configuration file to a library of files specifying user interface configuration. The managing information handling system may detect a change to a master policy indicator, such as a master security policy indicator, displayed on the user interface of the client information handling system. The change to the master policy indicator may include toggling of a switch or selection of a check box. When a master policy indicator is adjusted, the client information handling system may send a notification reporting the master policy indicator adjustment to be received by the managing information handing system. The managing information handling system may then detect one or more dependent policies that depend from the master policy, such as dependent security policies, and may update a policy value for each of the dependent policies based, at least in part, on the change in the master policy indicator.

Some embodiments of the system may include additional features that improve the user interface, operation, and strength of the security system. For example, the managing information handling system may update a value for the master policy based on the change in the master policy indicator. In some embodiments, indicators for the dependent policies may be hidden and not displayed on the user interface. In some embodiments, the managing information handling system may send a notification to the client information indicating the dependent policies that were adjusted based, at least in part on the change in the master policy indicator, and the client information handing system may adjust policy indicators for each of the dependent policies. Alternatively, the user interface may automatically adjust the dependent policy indicators upon detection of a change to the master policy indicator without receiving a notification from the managing information handling system.

A user may adjust the presentation of the user interface by selecting a basic view mode or an advanced view mode. the user interface may present a user with minimal options and information when the basic view mode is selected. The user interface may present the user with additional options and information when the advanced view mode is selected.

When an update to the dynamic user interface configuration is detected by the managing information handling system, the managing information handing system may dynamically update the user interface based on the update to the dynamic user interface configuration. For example, the managing information handling system may add additional policy configuration options to the user interface or additional information about product features and device configuration. Dynamically updating the user interface may include rearranging the elements of or adding new elements to the user interface and adjusting text and graphics displayed on the user interface. For example, the managing information handling system may adjust a user interface that was previously generated according to the detected update to the dynamic user interface configuration. Alternatively or additionally, the managing information handling system may re-generate the user interface to incorporate the update to the dynamic user interface configuration. The managing information handling system may continually monitor the dynamic user interface configuration to detect updates to the dynamic user interface configuration and may dynamically update the user interface whenever an update to the dynamic user interface configuration is detected.

After the user interface has been dynamically updated, the managing information handling system may transmit the updated user interface to the client information handling system. The client information handling system may receive the update and display the updated user interface without requiring a system or application restart. For example, from a user's perspective, the update to the user interface may appear instantaneous without interrupting use of the client information handling system The user interface may allow a user of the client information handling system to adjust policies governing multiple managed of information handling systems. For example, the managing information handling system may detect a change to a policy indicator displayed on the user interface of the client information handling system. Such a change may include toggling of a switch, selection of an option from a list of options, or any other adjustment of a policy indicator displayed on the user interface. When a change has been detected, the managing information handling system may update a policy value based on the change. For example, if the client managing handling system is a server storing a plurality of security policies for multiple managed information handling systems, the managing information handling system may adjust a security policy value based on the change. The managing information handling system may then transmit the updated policy value to the managed information handling systems to update the security policy settings on the managed information handling systems.

The managing information handling system may include a processor for performing the steps described herein. For example, a processor of the managing information handling system may detect an update to a dynamic user interface configuration, dynamically update the user interface, and transmit the updated user interface. A processor of the client information handling system may receive the updated user interface, may display the updated user interface, and may transmit notification of any changes made to policy indicators of the user interface to the managing information handling system.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
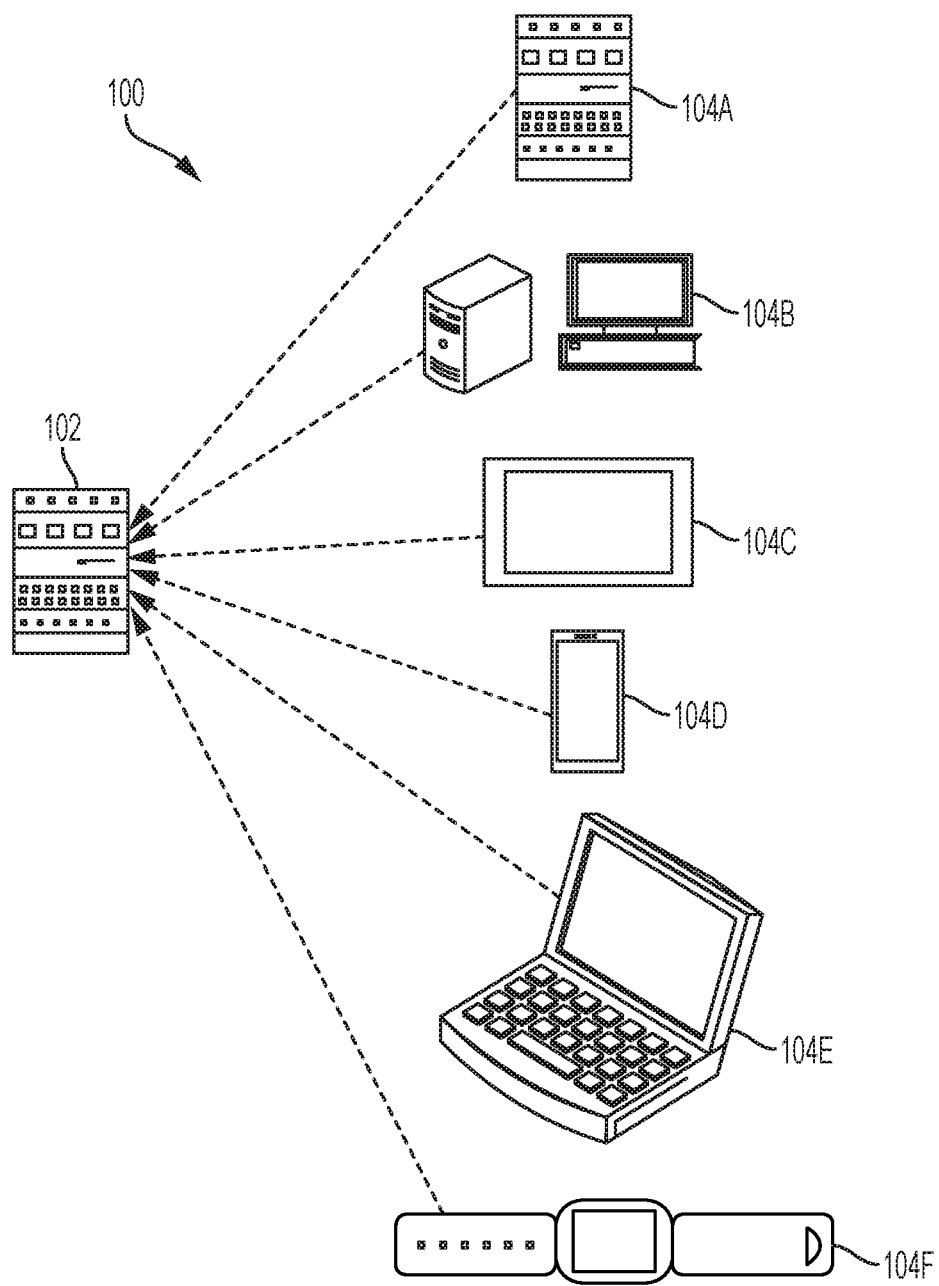
FIG. 1 is a network diagram of a managing information handling system connected to multiple managed information handling systems.

Information handling systems may be connected in a variety of configurations. For example, a network 100 of information handling systems, as shown in FIG. 1 may include a managing information handling system 102 that manages one or more operating characteristics of multiple managed information handling systems 104A-F. The managing information handling system 102 may be a remote web server in a data center. Managing information handling system 102 may be wirelessly connected to information handling systems 104A-F to manage one or more operating characteristics of information handling systems 104A-F, which may include servers 104A, desktop computers 104B, tablets 104C, smart phones 104D, laptop computers 104E, and smart devices such as smart watches 104F. For example, managing information handling system 102 may store and execute multiple privacy and/or security policies for managing operation of connected information handling systems 104A-F, such as encryption policies, cloud backup policies, authentication policies, threat prevention policies, and port control policies. A single connected information handling system, for example tablet 104C, may be designated as a client information handling system to allow an administrative user to manage the operating characteristics of information handling systems 104A-B and 104D-F. Alternatively, the managing information handling system 102 may be configured to recognize any of information handling systems 104A-F as the client information handling system upon entry of administrative credentials.

The managing information handling system 102 may generate a dynamic user interface and transmit the user interface to a client information handling system. For example, the managing information handling system 102 may scan multiple files stored by the managing information handling system 102 to locate files detailing information about a user interface for adjusting operating characteristics of the information handling systems 104A-F such as security and privacy policies. For example, a file or folder may exist for each of a plurality of products activated on the managing information handling system 102, containing information for dynamic generation of a user interface detailing policies and information related to each product. The products activated on the managing information handling system 102 may differ based on preferences of user, thus allowing multiple different combinations of products the information and settings for which are displayed in the user interface. When the managing information handling system 102 has located the files detailing information about the user interface, the managing information handling system 102 may dynamically generate a user interface based on information contained in the files. Instead of requiring manual design of a user interface for each possible combination of products, the managing information handling system 102 may generate a dynamic user interface based on the located files.

Figure 2A:
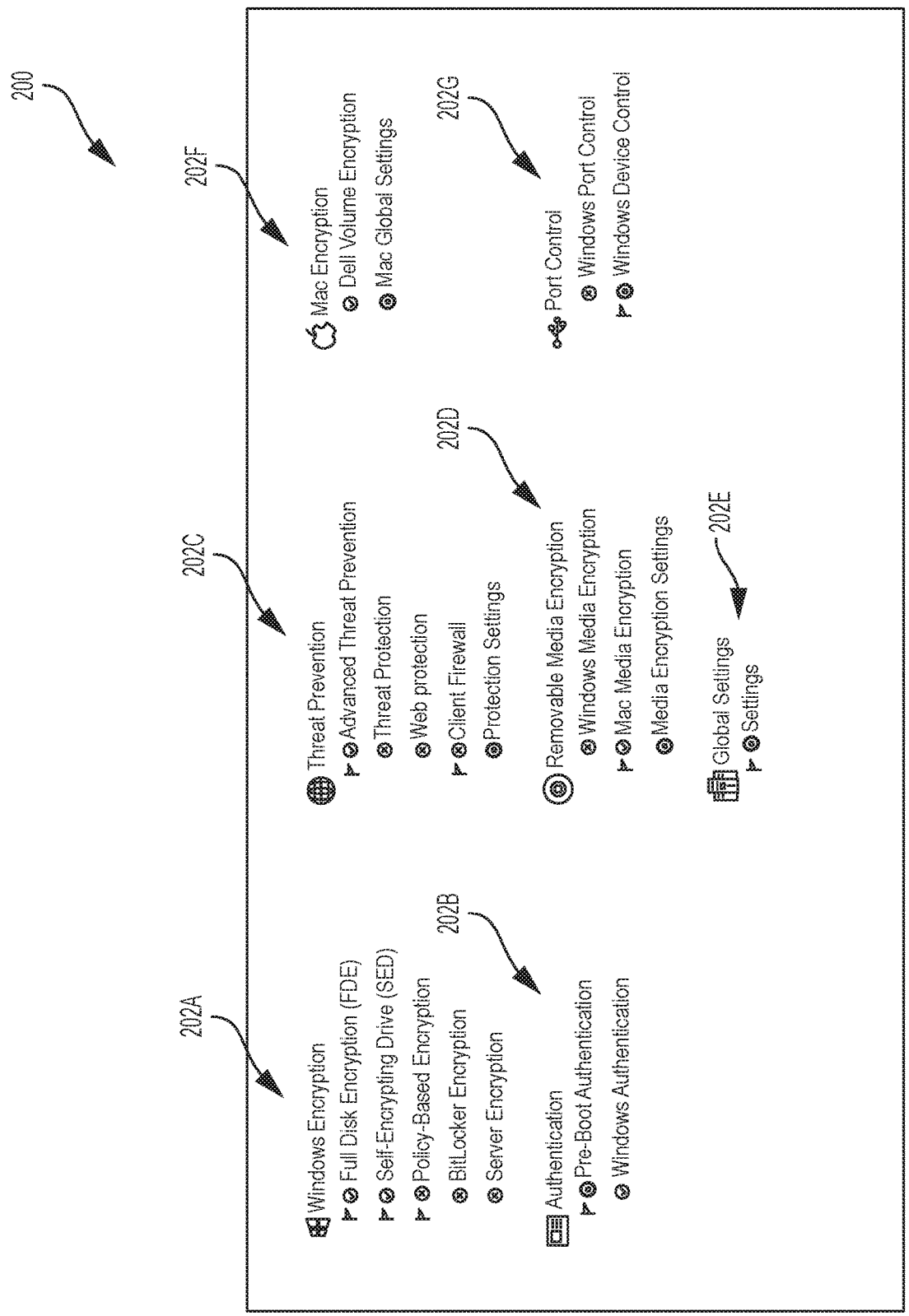
FIG. 2A is a view of a dynamically generated user interface according to some embodiments of the disclosure.

The managing information handling system 102 may, for example, generate a user interface 200 detailing the status of a plurality of security policies of the managed information handling systems as shown in FIG. 2A. Upon startup, the managing information handling system may read a plurality of user interface configuration files, such as extensible markup language (XML) configuration files, containing details about all policy information and options to be displayed. For example, the managing information handling system 102 may store files for technologies, such as a file for user interface features related to encryption policies that is used to generate the Windows Encryption area 202A, a file for user interface features related to authentication policies that is used to generate the Authentication area 202B, a file for user interface features related to threat prevention policies that is used to generate the Threat Prevention area 202C, a file for user interface features related to removable media encryption that is used to create the Removable Media Encryption area 202D, a file for user interface features related to global settings that is used to create the Global Settings area 202E, a file for user interface features related to Mac encryption that is used to create the Mac Encryption area 202F, and a file for user interface features related to port control that is used to create the port control area 202G. In some embodiments, one configuration file may contain a description of settings for a set of core services and additional configuration files may contain a description of settings for an additional service. The configuration files may include information such as a policy identifier and a policy category categorizing the policy as a master switch policy, a basic policy, or an advanced policy. User interface widget information may be included to provide a custom editor used for configuring the policy, such as allowing drop down menus, Boolean operations, and other user interface features. The configuration files may also include labeling and organizational information for displaying the policy configuration data and options in the user interface and dynamic range checking values for text and numerical entry fields. The configuration files may also include localization information for user interface generation. In some embodiments a file folder may exist for each technology containing multiple files for dynamic generation of the user interface, such as files or folders for each individual policy related to the technology. For example, a file folder may include a view file, such as a Vue web framework file or a freemarker template file, that is used to generate the organized display of options and information in the user interface. The managing information handling system may dynamically generate a user interface based on the files. In some embodiments, the user interface files may contain addresses of policy files containing information about and statuses of policies applied to managed information handling systems to allow extraction of the status of the policy, such as the name of the policy, a tooltip of the policy, a current value of the policy, and input validation information of the policy, for display in the user interface. A user may view the areas 202A-G of the user interface to determine the status of various policies, and may select policies to adjust or to view further information.

Figure 2B:
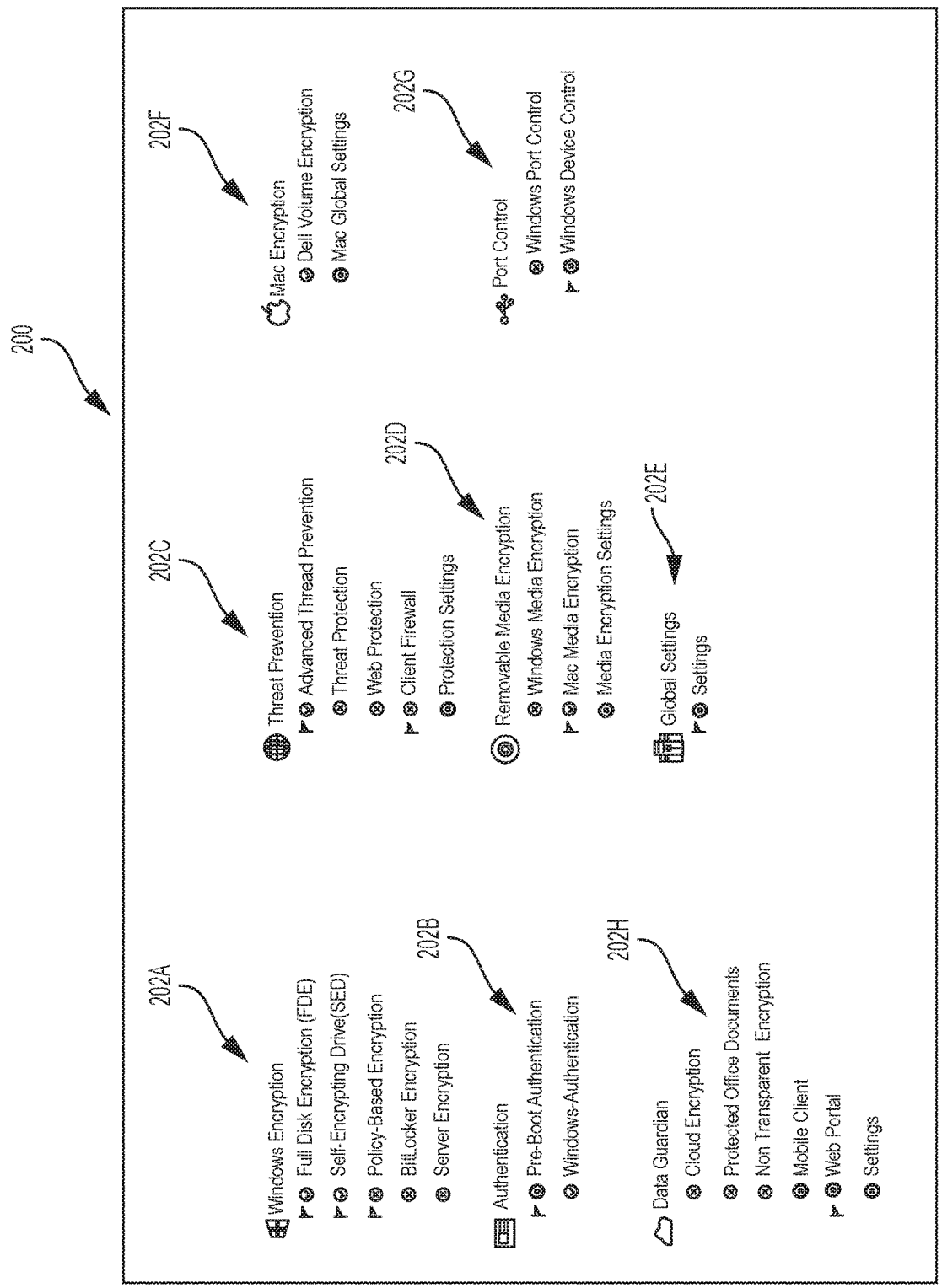
FIG. 2B is a view of an updated dynamically generated user interface according to some embodiments of the disclosure.

The managing information handling system 102 may dynamically update the user interface 200 based on an update to the user interface configuration. For example, an additional file for additional user interface features may be added to the managing information handling system when a new feature is added or purchased by a customer. When the new file is added, the dynamic user interface 200 may be dynamically updated, as shown in FIG. 2B. The dynamically updated user interface may be transmitted to a client device, such as device 104C, and displayed to a user. For example, a Data Guardian file, or folder containing multiple files, detailing user interface features related to a Data Guardian application may be added to the managing information handling system and may be used to generate the additional Data Guardian section 202H shown in FIG. 2B. The managing information handling system 102 may monitor a folder containing files for user interface features for addition of new files to the folder detailing additional sections or options for incorporation into the user interface 200.

Once the managing information handling system 102 has generated the dynamic user interface or dynamically updated the user interface, it may transmit the user interface to a client information handling system, such as information handling system 104C. The client information handling system 104C may display the user interface to allow a user to view information and adjust policies related to the operation of the information handling systems 104A-F. When a change is made to a policy indicator of the user interface displayed on the client information handling system 104C, the client information handling system 104C may transmit a notification to the managing information handling system 102. The managing information handling system 102 may then adjust the policy and may transmit the adjusted policy to the information handling systems 104A-F to adjust their operating characteristics. In some embodiments, the client information handling system 104C may not be governed by policies stored in the managing information handling system 102.

Figure 3A:
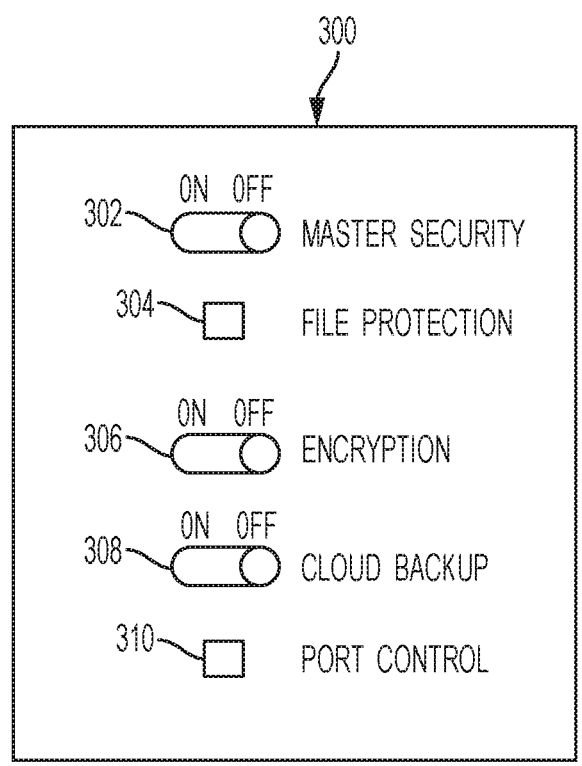
FIG. 3A is a view of a master policy switch with multiple dependent policy indicators according to some embodiments of the disclosure.

One element of a user interface may be an area 300 including a master policy indicator 302 with multiple dependent policy indicators 304-310, as shown in FIG. 3A. For example, the master policy indicator 302 may be a master security switch having an on position and an off position. The master policy indicator 302 may have multiple dependent policy indicators 304-310 such as a file protection check box 304, an encryption switch 306, a cloud backup switch 308, and a port control check box 310. Other master policy indicators and dependent policy indicators may also be present. In some embodiments the dependent policy indicators 304-310 may be hidden from view by a user.

Figure 3B:
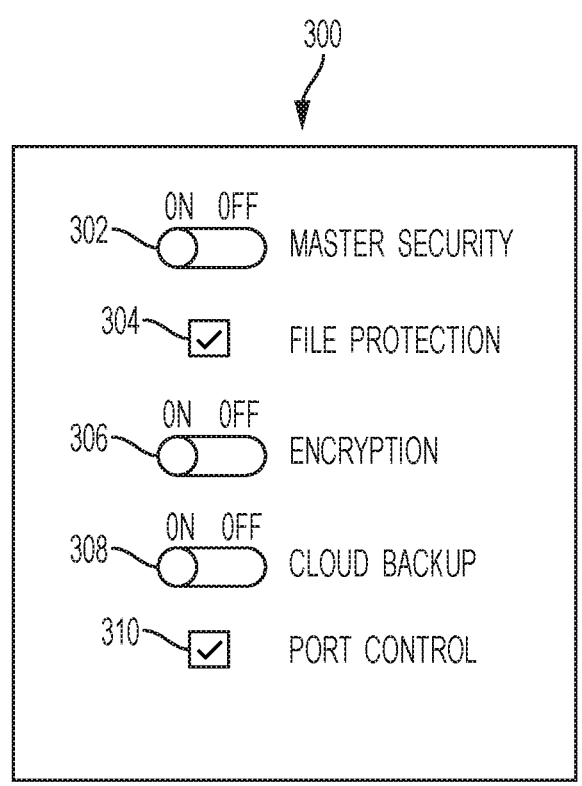
FIG. 3B is a view of a toggled master policy switch with multiple dependent policy indicators according to some embodiments of the disclosure.

When a user toggles the master policy indicator 302, the dependent policy indicators may be toggled automatically. For example, when the master policy indicator 302 is moved from the off position, as shown in FIG. 3A, to the on position, as shown in FIG. 3B, the check boxes 304, 310 may be checked, and the switches 306-308 may be toggled to the on position automatically. Thus, when a user toggles a master policy indicator 302, dependent policy indicators 304-310 for dependent policies that depend from the master policy may also be toggled. Furthermore, when a master policy indicator is toggled on the client information handling system, a managing information handling system may receive a notification of the change in the master policy indicator and may change policy values for the master policy and policy values for all policies dependent on the master policy stored on the managing information handling system based on the change in the master policy indicator.

Figure 4:
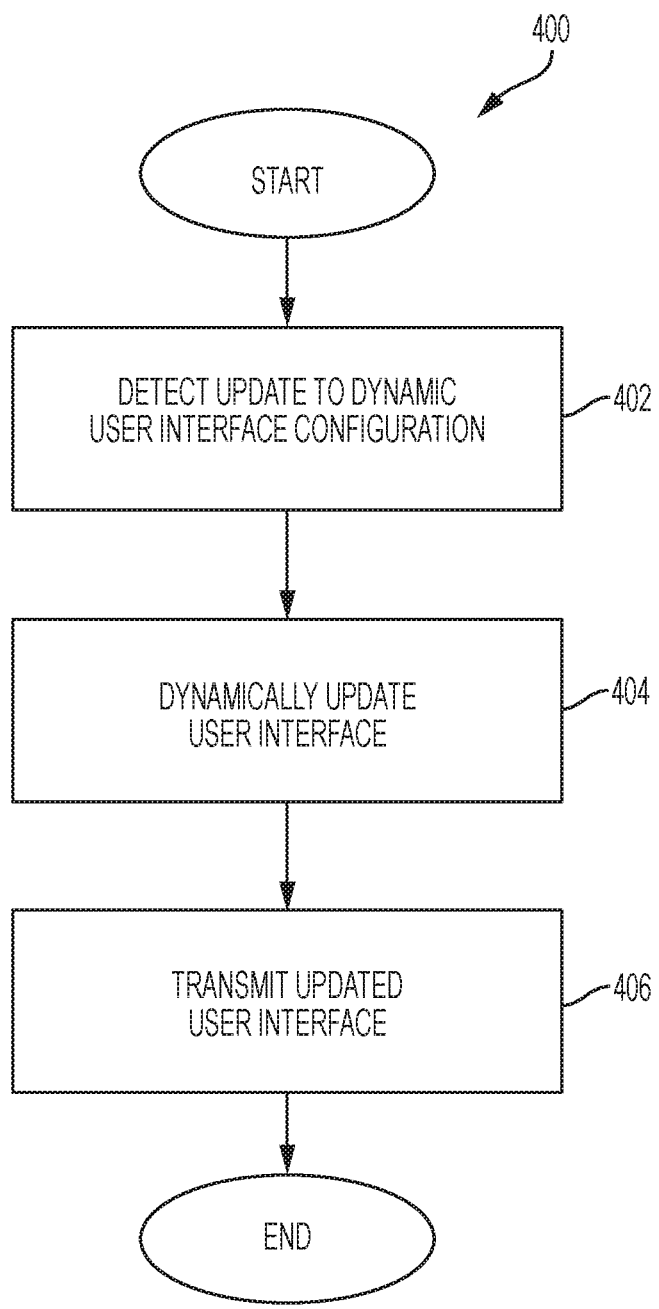
FIG. 4 is a flow chart of an example method for dynamically updating a user interface update according to some embodiments of the disclosure.

A managing information handling system may dynamically update a user interface based on a change to a user interface configuration stored on the managing information handling system. A method 400 for dynamically updating a user interface, as shown in FIG. 4, may begin, at step 402, with detecting an update to a dynamic user interface configuration. For example, a managing information handling system may detect an addition of a new file detailing additional user interface features, such as additional policy information and configuration options for a newly purchased or added product.

In some embodiments, a user may be able to adjust the presentation of the user interface by selecting an advanced view mode or a basic view mode on a client information handling system. If the user selects an advanced view mode, the user interface may display advanced options for configuring managed information handling systems, such as advanced privacy and security policy options. If the user selects a basic view mode, the user interface may hide multiple options and present a simplified set of options The user interface may then be dynamically updated, at step 404, based on the update to the dynamic user interface configuration. For example, the managing information handling system may add a new section or new policy options to the user interface and may reorganize the user interface based on the new file added.

The updated user interface may then be transmitted, at step 406, to a client information handling system. For example, the managing information handling system may transmit the updated user interface to a client information handling system, such as an information handing system designated for configuration of policies stored on the managing information handling system or an information handling system on which administrative credentials have been entered. The client information handling system may receive the updated user interface and may display the updated user interface without requiring a restart of the client information handling system or an application displaying the user interface.

A user of the client information handling system may adjust one or more policy indicators displayed in the user interface to adjust policies applied to multiple managed information handling systems. For example, a user may adjust privacy or security policy settings of multiple information handling systems managed by the managing information handling system. A method 500 for updating policy values of one or more policies, shown in FIG. 5, may begin with detecting a change to a policy indicator at step 502. For example, client information handling system may detect a change to a policy indicator displayed in the user interface and may transmit a notification of the change to the managing information handling system. The managing information handling system may then update, at step 504, a policy value associated with the policy value indicator stored on the managing information handling system. The managing information handling system may then transmit, at step 506, the updated policy value to multiple information handling systems managed by the managing information handling system. When the updated policy value is received by the managed information handling systems, policy values for each of the managed information handling systems may be updated. For example, in the case of a security policy, security settings for each of the managed information handling systems may be updated.

Dependency mechanisms may be included in the user interface to allow multiple dependent policies to be automatically adjusted based on a change to a master policy indicator. For example, a configuration file used in generating the user interface may include information, or an address to access information, about policy dependencies that may be used in generating the user interface. A method 600 for updating dependent policies based on a change to a master policy indicator, shown in FIG. 6, may begin, at step 602, with detecting a change in a master policy indicator for a master policy, such as a master security indicator. For example, the client information handling system may detect a change to a master policy indicator and may transmit a notification of the change to the managing information handling system. At step 604, one or more policies, stored on the managing information handling system, may be detected that depend from the master policy. For example, the managing information handling system may search files stored on the managing information handling system for policies that depend from the master policy. The managing information handling system may then, at step 606, update values for each of the dependent policies, and the master policy, based on the change to the master policy indicator. For example, multiple dependent security policies may be activated when a master security switch is moved from an off position to an on position. The client information handling system may also update dependent policy indicators of the user interface for policies that depend from the master policy. Alternatively, the user interface may not display policy indicators for dependent policies. The managing information handling system may transmit the updated master and dependent policy values to one or more managed information handling systems to update security and/or privacy settings on each managed information handling system.

Figure 5:
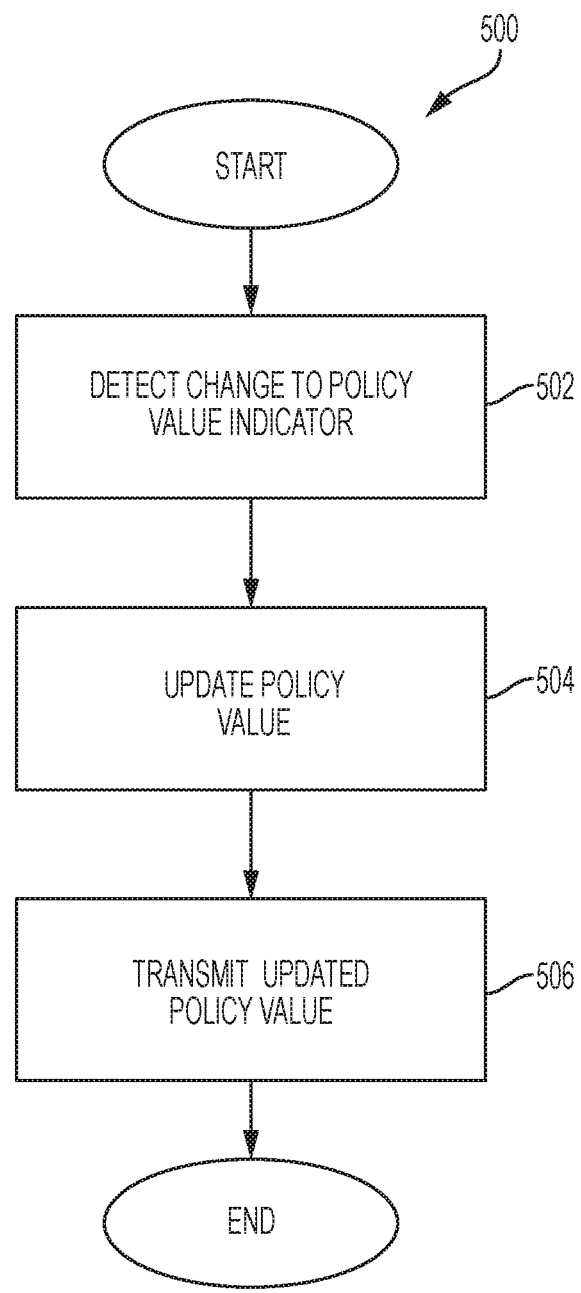
FIG. 5 is a flow chart of an example method for dynamically updating a user interface and updating policy values according to some embodiments of the disclosure.
Figure 6:
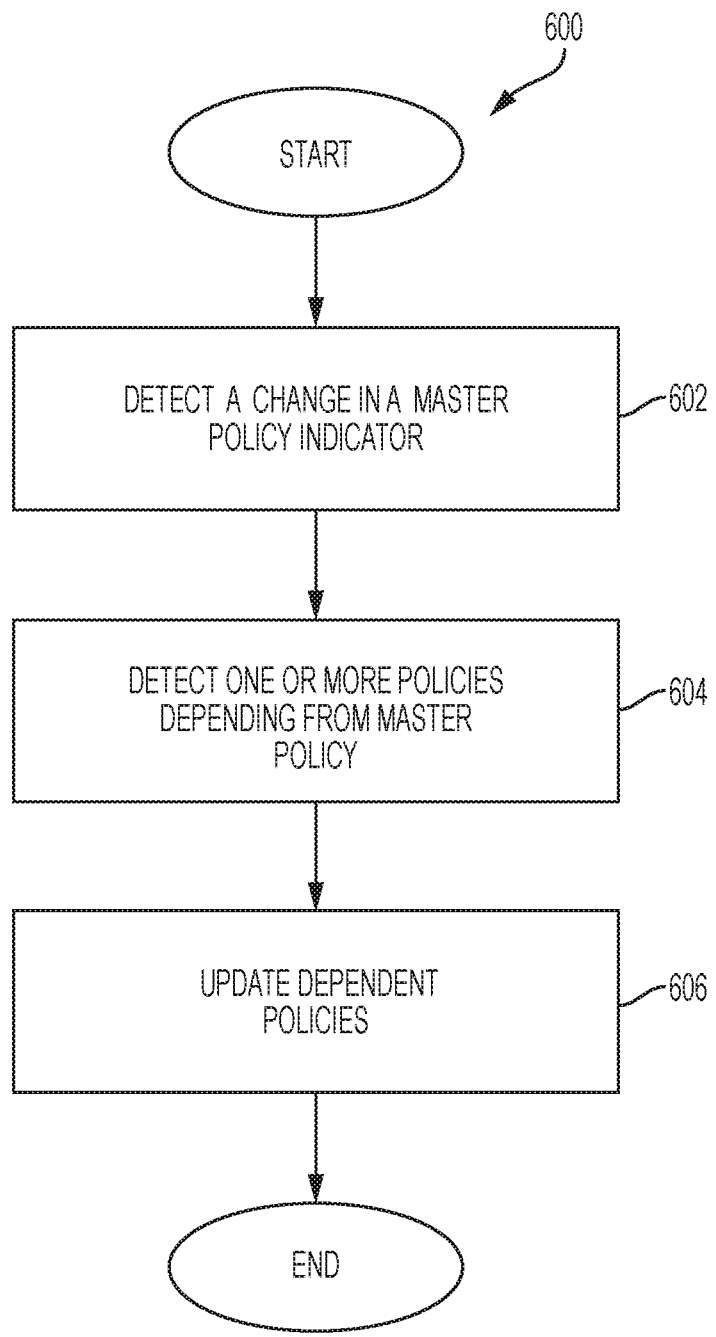
FIG. 6 is a flow chart of an example method for execution of a dependency mechanism according to some embodiments of the disclosure.

The schematic flow chart diagram of FIGS. 4-6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    receiving, by a managing information handling system, a notification of a change in a master policy indicator, from a client information handling system,
    detecting, by the managing information handling system, one or more dependent policies that depend from a master policy indicated by the master policy indicator,
    updating a value for each of the one or more dependent policies and a value for the master policy based, at least in part, on the change in the master policy indicator; and
    transmitting, to one or more managed information handling systems different from the managing information handling system, the updated values for each of the one or more dependent policies and the updated value for the master policy.

2. The method of claim 1, wherein the master policy indicator is displayed on a user interface, and wherein indicators for the one or more dependent policies are hidden and not displayed on the user interface.

3. The method of claim 1, wherein the master policy indicator is a master security policy indicator, and wherein the one or more dependent policies are dependent security policies.

4. The method of claim 3, wherein the one or more dependent security policies comprise at least one of: a file protection policy, an encryption policy, a cloud backup policy, or a port control policy.

5. The method of claim 1, wherein the change in the master policy indicator comprises toggling of a master policy switch on a user interface.

6. The method of claim 1, wherein the master policy indicator and indicators for the one or more dependent policies are displayed on a user interface, and wherein the indicators for the one or more dependent policies comprise at least one of check boxes or switches.

7. A managing information handling system comprising:
a processor configured to perform steps comprising:
receiving a notification of a change in a master policy indicator, from a client information handling system,
detecting one or more dependent policies that depend from a master policy indicated by the master policy indicator,
updating a value for each of the one or more dependent policies and a value for the master policy based, at least in part, on the change in the master policy indicator; and
transmitting, to one or more managed information handling systems different from the managing information handling system, the updated values for each of the one or more dependent policies and the updated value for the master policy.

8. The apparatus of claim 7, wherein the master policy indicator is displayed on a user interface, and wherein indicators for the one or more dependent policies are hidden and not displayed on the user interface.

9. The apparatus of claim 7, wherein the master policy indicator is a master security policy indicator, and wherein the one or more dependent policies are dependent security policies.

10. The apparatus of claim 9, wherein the one or more dependent security policies comprise at least one of: a file protection policy, an encryption policy, a cloud backup policy, or a port control policy.

11. The apparatus of claim 7, wherein the change in the master policy indicator comprises toggling of a master policy switch on a user interface.

12. The apparatus of claim 7, wherein the master policy indicator and indicators for the one or more dependent policies are displayed on a user interface, and wherein the indicators for the one or more dependent policies comprise at least one of check boxes or switches.

13. A system, comprising:
a managing information handling system;
a client information handling system; and
one or more managed information handling systems,
wherein the managing information handling system comprising a processor configured to perform steps comprising:
receiving a notification of a change in a master policy indicator, from the client information handling system,
detecting one or more dependent policies that depend from a master policy indicated by the master policy indicator,
updating a value for each of the one or more dependent policies and a value for the master policy based, at least in part, on the change in the master policy indicator; and
transmitting, to the one or more managed information handling systems different from the managing information handling system, the updated values for each of the one or more dependent policies and the updated value for the master policy.

14. The system of claim 13, wherein the master policy indicator is displayed on a user interface of the client information handling system, and wherein indicators for the one or more dependent policies are hidden and not displayed on the user interface.

15. The system of claim 13, wherein the master policy indicator is a master security policy indicator, and wherein the one or more dependent policies are dependent security policies.

16. The system of claim 15, wherein the one or more dependent security policies comprise at least one of: a file protection policy, an encryption policy, a cloud backup policy, or a port control policy.

17. The system of claim 13, wherein the change in the master policy indicator comprises toggling of a master policy switch on a user interface.

18. The system of claim 13, wherein the master policy indicator and indicators for the one or more dependent policies are displayed on a user interface of the client information handling system, and wherein the indicators for the one or more dependent policies comprise at least one of check boxes or switches.

* * * * *